May 10, 1949. J. G. JACKSON 2,469,731
AUDIBLE REEL SIGNAL FOR MOTION-PICTURE PROJECTORS
Original Filed Dec. 1, 1943
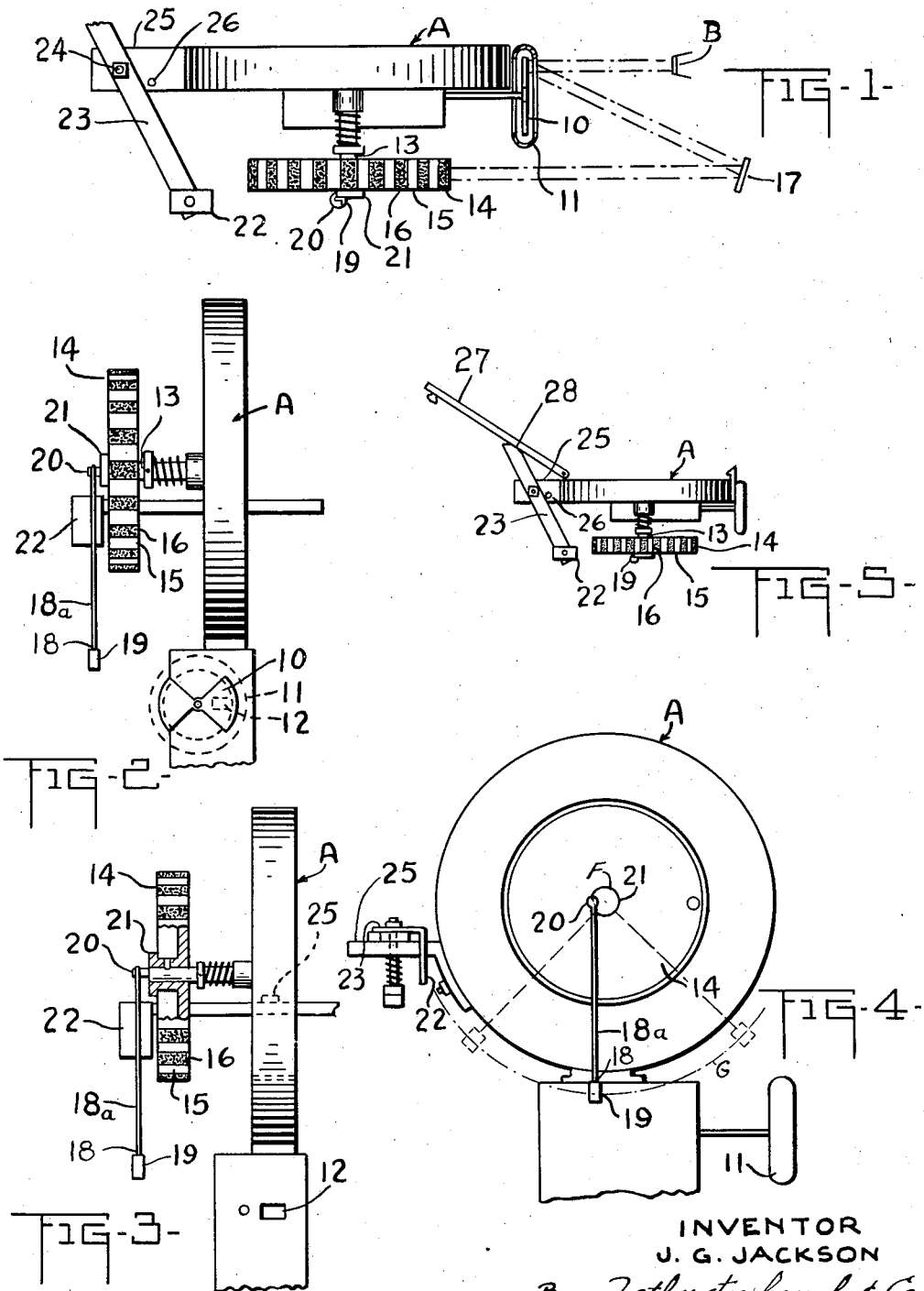
INVENTOR
J. G. JACKSON
By: Fetherstonhaugh & Co.
ATT'YS Patented May 10, 1949

2,469,731

UNITED STATES PATENT OFFICE 2,469,731

AUDIBLE REEL SIGNAL FOR MOTION-PICTURE PROJECTORS

James Gordon Jackson, Vancouver, British Columbia, Canada, assignor of one-half to James Nelson Trumpour, Port Alberni, British Columbia, Canada Original application December 1, 1943, Serial No. 512,491. Divided and this application December 29, 1945, Serial No. 638,114

5 Claims. (Cl. 116—74)

This invention relates to audible reel signals for motion picture projectors and this application is a division of my co-pending application, Serial No. 512,491, filed as of December 1, 1943, which has matured to Patent No. 2,433,908, dated January 6, 1948.

It is necessary that a motion picture projector operator be prewarned that a second projector should be placed in operation upon completion of the reel in the first projector. Audible signals have previously been employed for this purpose but in most cases have involved complicated construction causing a squeal or chatter in operation which distracts from the effect of the signal. Furthermore, they have required frequent servicing. The above mentioned disadvantages are overcome by my invention.

It is, therefore, an object of this invention to provide a very simple audible signal means for indicating that the showing of a motion picture reel is about completed.

A further object of this invention is to provide a simple signal which will be brought into operation by the speed of the reel and which will be substantially free from squeal or chatter.

A further object of this invention is to provide an audible signal means employing a minimum of parts.

A still further object of this invention is to provide an audible signal which by reason of its particular simplicity and few parts will avoid frequent servicing.

With these and other objects in view, the invention generally comprises audible signalling means including a pendulum operable by the reel shaft, the motion of said pendulum becoming an accentuated oscillation as the angular velocity of the reel approaches the natural frequency of the pendulum and a cooperating sound-producing means intermittently engaged by the swinging pendulum.

The invention will be clearly understood by reference to the following detailed specification taken in conjunction with the accompanying drawings.

In the drawing,

Fig. 1 is a top plan view of the top reel of a projecting machine shown in conjunction with a rotatable rear shutter and illustrating a rotatable drum used in conjunction with a visual signal means of a co-pending application.

Fig. 2 is a front elevation of Fig. 1 illustrating the swingable pendulum associated with the drum for effecting an audible signal.

Fig. 3 is a front elevation similar to Fig. 2 but with the shutter removed and showing the drum partially in section.

Fig. 4 is a side elevation of Fig. 3; and

Fig. 5 is a miniature top plan view of the projecting machine illustrating the cooperation between the door of the projector and the audible signal.

Referring to the drawings, A indicates the casing of the feeding motion picture reel and B indicates a light source, intermittently projected through the film, in combination with the rotatable rear shutter 10 housed within the shutter casing 11. The beam is designed to be projected through the opening 12 of the projector. On the reel shaft 13 a drum 14 is mounted which is divided into a plurality of light and dark bands 15 and 16, and may be employed operating in conjunction with the light source B and mirror 17 as a visual signal means which is the subject of a co-pending application.

The audible signal means includes a pendulum 18 having a shank 18a and a movable weight 19, said pendulum being eccentrically pivoted at 20 to a disk or collar member 21 connected to and rotatable with the reel shaft. The weight 19 is slidable on the shank 18a and is held in any desired position by friction, or by a set screw, not shown. The pendulum is designed to cooperate with a means for producing a sound signal at a predetermined time. One such means for producing sound may take the form of a chime plate 22. The chime plate (or audible signal member) is positioned on a chime arm 23 pivotable about the point 24 as shown in Fig. 1, said arm being mounted on a suitable bracket 25 attached to the film housing as shown in Fig. 4. A stop 26 (Fig. 1) is provided on bracket 25 for the purpose of automatically setting the chime arm 23 in the correct operating position.

In operation, this device depends upon the fact that as the film becomes used, the angular speed of the reel increases in order that the film may pass the projecting lens at a constant speed. The upper end of the pendulum follows the circle of rotation of the pivot point 20 and said pendulum gently sways back and forth through a small arc until the shaft 13 attains a frequency of rotation equal to the natural frequency of the pendulum. At this point, the pendulum swings freely in a wide arc and strikes the chime signal intermittently over a brief period of time. The upper end of the pendulum follows the path marked F while the lower end moves up and down and at the same time, swings in an arcuate path, the centre line of which is marked G.

When the operator has heard the audible signal, he may swing the chime arm 23 member about its pivot point 24 to position the audible signal clear of the swinging pendulum, thus eliminating its continuing operation. The signal chime thus removed from the path of the swinging pendulum is automatically repositioned in its operating position as the door of the film housing is opened to replace the run-out film. This operation is best understood by reference to Fig. 5.

The film housing door 27 is opened and engages the projecting end of the pivoted chime arm 23 as at 28 causing the chime arm to swing back to its operating position against stop pin 26. Thus, after a used reel has been replaced, the alarm is always set for the correct operation of the signal. The natural frequency of the pendulum is variable with the positioning of the weight on the shank, hence the angular velocity of the reel shaft at which the arm sounds can be varied by varying the position of the pendulum weight on the shaft. It is, therefore, a simple matter to use the same signal for more than one hub size by varying the position of the weight on the pendulum shank.

From the foregoing it is evident that I have provided a simple audible signal for motion picture reels and the like operable by the rotation of the reel. It employs a minimum of parts, is free from noise and is easily adaptable for use in conjunction with varied sizes of reel hubs to produce a signal at a predetermined time.

What I claim as my invention is:

1. An audible signal for reels of motion picture projectors comprising an oscillatory means operatively connected to the reel shaft and a sound producing means, said oscillatory means being designed continuously to oscillate with a maximum amplitude at a predetermined reel speed to operate the sound producing means, the latter being adjustably mounted and movable between an operative position and an inoperative position out of the path of the oscillatory means, and movable means in connection with said projector movable when changing a reel for actuating said sound producing means into an operative position.

2. An audible signal for reels of motion picture projectors as claimed in claim 1 in which the sound producing means is mounted on an arm adjacent one end thereof, said arm being pivotally mounted intermediate its ends on said projector, the opposite end of said arm freely projecting, said movable means on said projector being designed to engage the freely projecting end of said arm to return the latter and the sound producing means to operative position.

3. An audible signal for reels of motion picture projectors and the like comprising oscillatory means and a sound producing means, said oscillatory means including a free pendulum pivotally connected and eccentric to a hub, said hub being operatively connected to the reel shaft and said pendulum being caused to oscillate freely with a maximum amplitude at a predetermined reel speed, said sound producing means being operatively positioned in the arc of the freely swinging pendulum substantially at the point of the maximum arcuate motion of said pendulum.

4. An audible signal for reels of motion picture projectors and the like comprising a disc mounted on and rotatable with the reel shaft, a free pendulum pivoted at its upper end to the disc eccentrically thereof, a weight adjustably mounted on the pendulum adjacent its opposite end, said pendulum oscillating gently in an arcuate path as the disc rotates, and sound producing means located at an extremity of the path of the free end of the pendulum, said sound producing means being struck by the pendulum when the latter oscillates freely with a maximum amplitude at a predetermined reel speed.

5. An audible signal as claimed in claim 4 in which the sound producing means is mounted on one end of an arm, said arm being pivoted between the ends thereof, means for stopping the arm with the sound producing means in its operative position, and the opposite end of the arm being engaged by the film housing door when the latter is opened to move the sound producing means into position.

JAMES GORDON JACKSON.

REFERENCES CITED

The following references are of record in the file of this patent:

UNITED STATES PATENTS

| Number | Name | Date |
|---|---|---|
| 2,138,648 | Stankey | Nov. 29, 1938 |
| 2,140,227 | Hemmingson | Dec. 13, 1938 |
| 2,175,938 | Fry | Oct. 10, 1939 |